(12) United States Patent
Van Thorre et al.

(10) Patent No.: US 8,361,282 B2
(45) Date of Patent: Jan. 29, 2013

(54) SYSTEM AND METHOD USING A MICROWAVE-TRANSPARENT REACTION CHAMBER FOR PRODUCTION OF FUEL FROM A CARBON-CONTAINING FEEDSTOCK

(75) Inventors: Douglas Van Thorre, Minneapolis, MN (US); Michael Catto, Moore, SC (US); Sherman Aaron, Wilkesboro, NC (US)

(73) Assignee: TekGar, LLC, Moore, SC (US)

( * ) Notice: Subject to any disclaimer, the term of this patent is extended or adjusted under 35 U.S.C. 154(b) by 272 days.

(21) Appl. No.: 12/854,754

(22) Filed: Aug. 11, 2010

(65) Prior Publication Data

US 2011/0036706 A1 Feb. 17, 2011

Related U.S. Application Data

(60) Provisional application No. 61/233,694, filed on Aug. 13, 2009.

(51) Int. Cl.
*C07C 1/00* (2006.01)
*C07C 4/00* (2006.01)
*C07C 4/02* (2006.01)
*B01J 19/12* (2006.01)
*G05D 23/00* (2006.01)
*H05B 6/64* (2006.01)
*H05B 6/80* (2006.01)

(52) U.S. Cl. .............. 204/157.15; 422/186.29; 422/109; 219/702; 219/678

(58) Field of Classification Search ............. 422/186.29, 422/109; 204/157.15; 219/702, 678
See application file for complete search history.

(56) References Cited

U.S. PATENT DOCUMENTS

| | | | | | |
|---|---|---|---|---|---|
| 3,867,606 | A | * | 2/1975 | Peterson | 219/748 |
| 3,916,137 | A | * | 10/1975 | Jurgensen | 219/696 |
| 4,121,078 | A | * | 10/1978 | Takano et al. | 219/754 |
| 4,326,114 | A | * | 4/1982 | Gerling et al. | 219/701 |
| 4,459,450 | A | * | 7/1984 | Tyler et al. | 219/701 |
| 4,565,670 | A | * | 1/1986 | Miyazaki et al. | 422/186.04 |
| 4,631,380 | A | * | 12/1986 | Tran | 219/700 |
| 5,242,663 | A | * | 9/1993 | Shiomi et al. | 422/186.29 |
| 5,946,816 | A | * | 9/1999 | Smith | 34/265 |

(Continued)

FOREIGN PATENT DOCUMENTS

| DE | 102009033216 | 1/2011 |
|---|---|---|
| WO | WO9505431 | 2/1995 |
| WO | WO2009067266 | 5/2009 |

OTHER PUBLICATIONS

International Search Report and Written Opinion dated Nov. 9, 2010 from PCT Application No. PCT/US2010/045345, 13 pages.

Oliveira, "Sample Preparation for Atomic Spectroscopy: Evolution and Future Trends", Journal of the Brazilian Chemical Society, vol. 14, No. 2, Apr. 15, 2003, pp. 1-20.

(Continued)

*Primary Examiner* — Keith Hendricks
*Assistant Examiner* — Colleen M Raphael
(74) *Attorney, Agent, or Firm* — Hollingsworth Davis, LLC

(57) ABSTRACT

Approaches for producing fuel from a carbon-containing feedstock are described. Feedstock is introduced into a substantially microwave-transparent reaction chamber. A microwave source emits microwaves which are directed through the microwave-transparent wall of the reaction chamber to impinge on the feedstock within the reaction chamber. The microwave source may be rotated relative to the reaction chamber. The feedstock is subjected to microwaves until the desired reaction occurs to produce a fuel. A catalyst can be mixed with the feedstock to enhance the reaction process.

28 Claims, 9 Drawing Sheets

U.S. PATENT DOCUMENTS

| | | | |
|---|---|---|---|
| 6,184,427 B1 | 2/2001 | Klepfer et al. | |
| 6,653,517 B2 * | 11/2003 | Bullock | 585/241 |
| 6,826,596 B1 * | 11/2004 | Suzuki | 709/206 |
| 7,118,917 B2 | 10/2006 | Bergh | |
| 7,951,270 B2 * | 5/2011 | Ludlow-Palafox et al. | 422/186 |
| 2007/0102279 A1 | 5/2007 | Novak | |
| 2007/0131591 A1 | 6/2007 | Pringle | |
| 2008/0185377 A1 * | 8/2008 | Mickey et al. | 219/751 |
| 2008/0264934 A1 * | 10/2008 | Moreira et al. | 219/702 |
| 2008/0314730 A1 * | 12/2008 | Pringle | 204/157.6 |
| 2009/0118803 A1 * | 5/2009 | Fallik | 219/710 |
| 2009/0232725 A1 | 9/2009 | Aaron | |
| 2010/0256429 A1 * | 10/2010 | Li et al. | 422/187 |

OTHER PUBLICATIONS

Zischka et al., "Closed Vessel Microwave-Assisted Wet Digestion with Simultaneous Control of Pressure and Temperature in All Vessels", Freseniuns Journal of Analytical Chemistry, vol. 361, Dec. 31, 1998, pp. 90-95.

Dec. 31, 1994 Flores et al., "Microwave-Assisted Sample Combustion: A Technique for Sample Preparation in Thrace Element Determination", Analytical Chemistry 2004, vol. 76, pp. 3525-3529.

Bionic Fuel Technologies, "Thermo Catalytic Depolymerization—Processing Plant for the Synthetic Production of Fuels from Biomass and Waste Materials", Jan. 20, 2007, 20 pages.

* cited by examiner

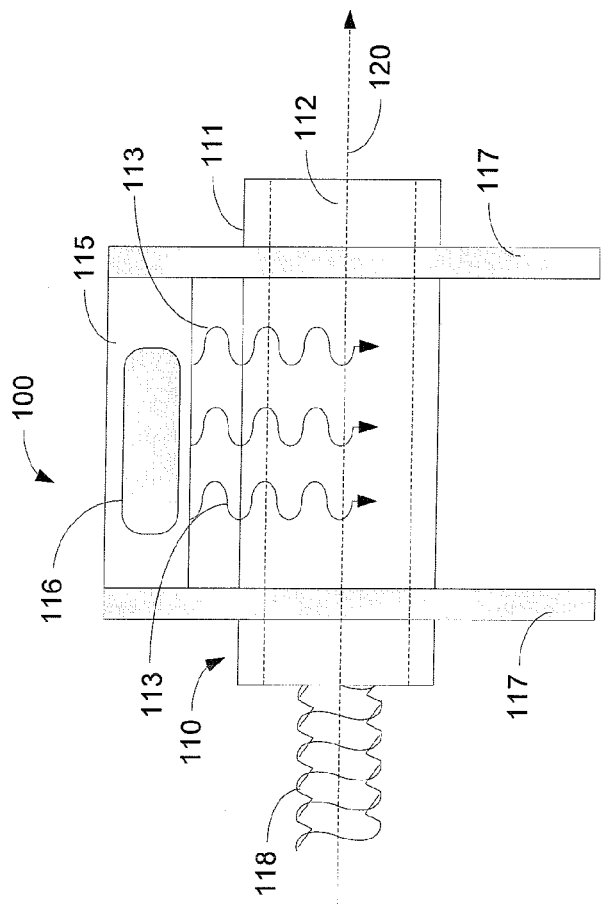
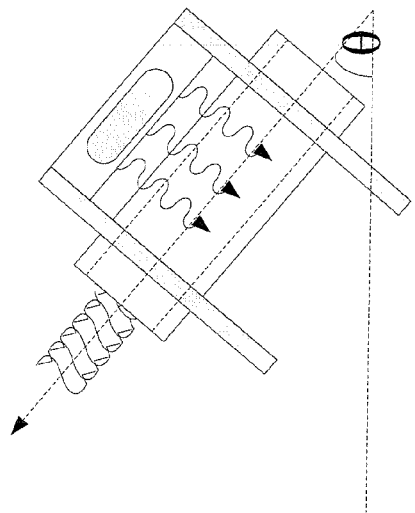
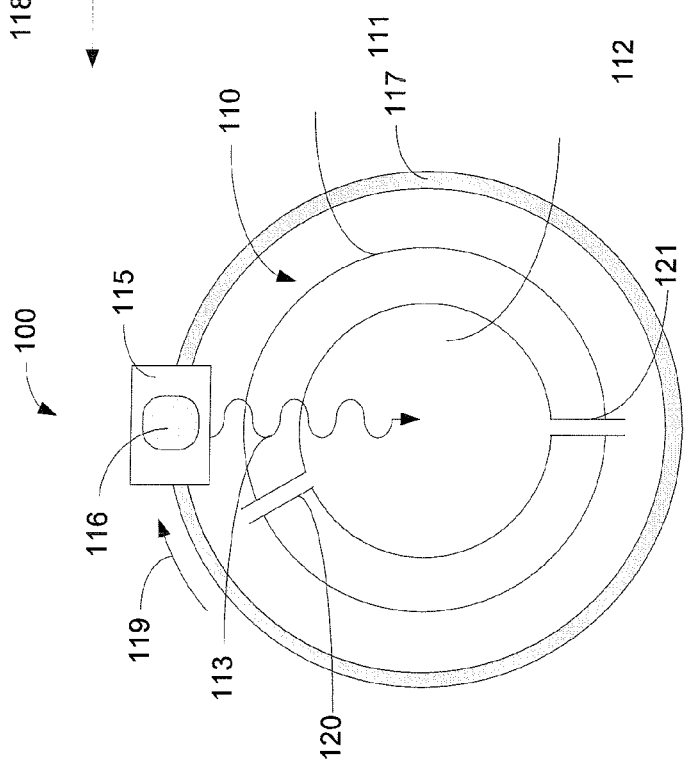
Figure 1A
Figure 1C
Figure 1B

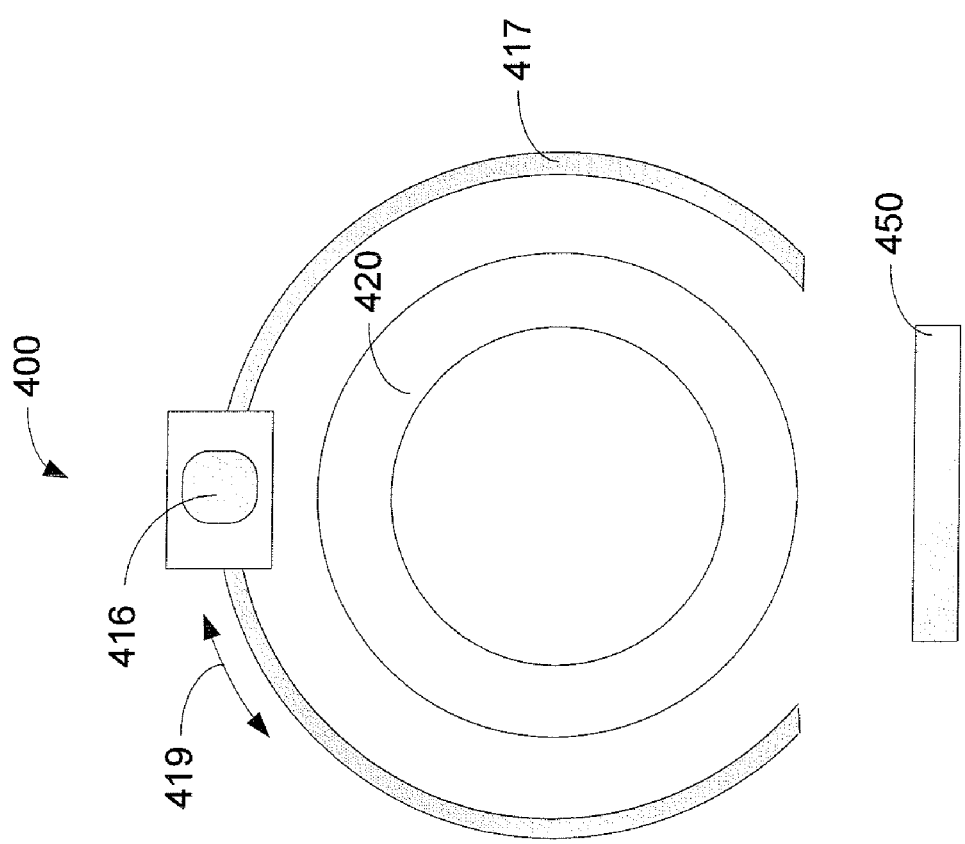

SYSTEM AND METHOD USING A MICROWAVE-TRANSPARENT REACTION CHAMBER FOR PRODUCTION OF FUEL FROM A CARBON-CONTAINING FEEDSTOCK

RELATED APPLICATION

This application claims the benefit of Provisional Patent Application Ser. No. 61/233,694, filed on Aug. 13, 2009, to which priority is claimed pursuant to 35 U.S.C. §119(e) and which is hereby incorporated herein by reference.

FIELD OF THE INVENTION

The present invention relates generally to the production of fuel from a carbon-containing feedstock.

BACKGROUND OF THE INVENTION

The vast majority of fuels are distilled from crude oil pumped from limited underground reserves. As the earth's crude oil supplies are depleted, the world-wide demand for energy is simultaneously growing. Over the next ten years, depletion of the remaining world's easily accessible crude oil reserves will lead to a significant increase in cost for fuel obtained from crude oil.

The search to find processes that can efficiently convert renewable materials to fuels suitable for transportation and/or heating is an important factor in meeting the ever-increasing demand for energy. Methods and systems for efficiently converting carbon-based feedstocks such as biomass into liquid fuel are needed. The present invention fulfills these needs and provides various advantages over the prior art.

SUMMARY OF THE INVENTION

Embodiments of the present are directed to a system for producing fuel from a carbon-containing feedstock. The system includes at least one reaction chamber comprising at least one microwave-transparent chamber wall and a reaction cavity configured to hold the carbon-containing feedstock. A microwave subsystem includes at least one device configured to emit microwaves when energized. The microwave device is positioned relative to the reaction chamber so that the microwaves are directed through the microwave-transparent chamber wall and into the reaction cavity. The system also includes a mechanism that provides relative motion between the microwave device and the reaction chamber.

Another embodiment of the invention involves a process for converting a carbon-containing compound to fuel. A carbon-containing feedstock is input into a substantially microwave-transparent reaction chamber. Microwaves are directed from a microwave source through walls of the reaction chamber to impinge on the feedstock. The feedstock is microwaved until it reacts to produce a fuel.

The above summary is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 1A and 1B illustrate side and cross sectional views, respectively, of a system configured to convert carbon-containing materials to fuel in accordance with embodiments of the invention;

FIG. 1C is a diagram of a tilted reaction chamber system in accordance with embodiments of the invention;

FIG. 4 illustrates a system having a rotating magnetron in addition to a secondary heat source;

Figure 1D:
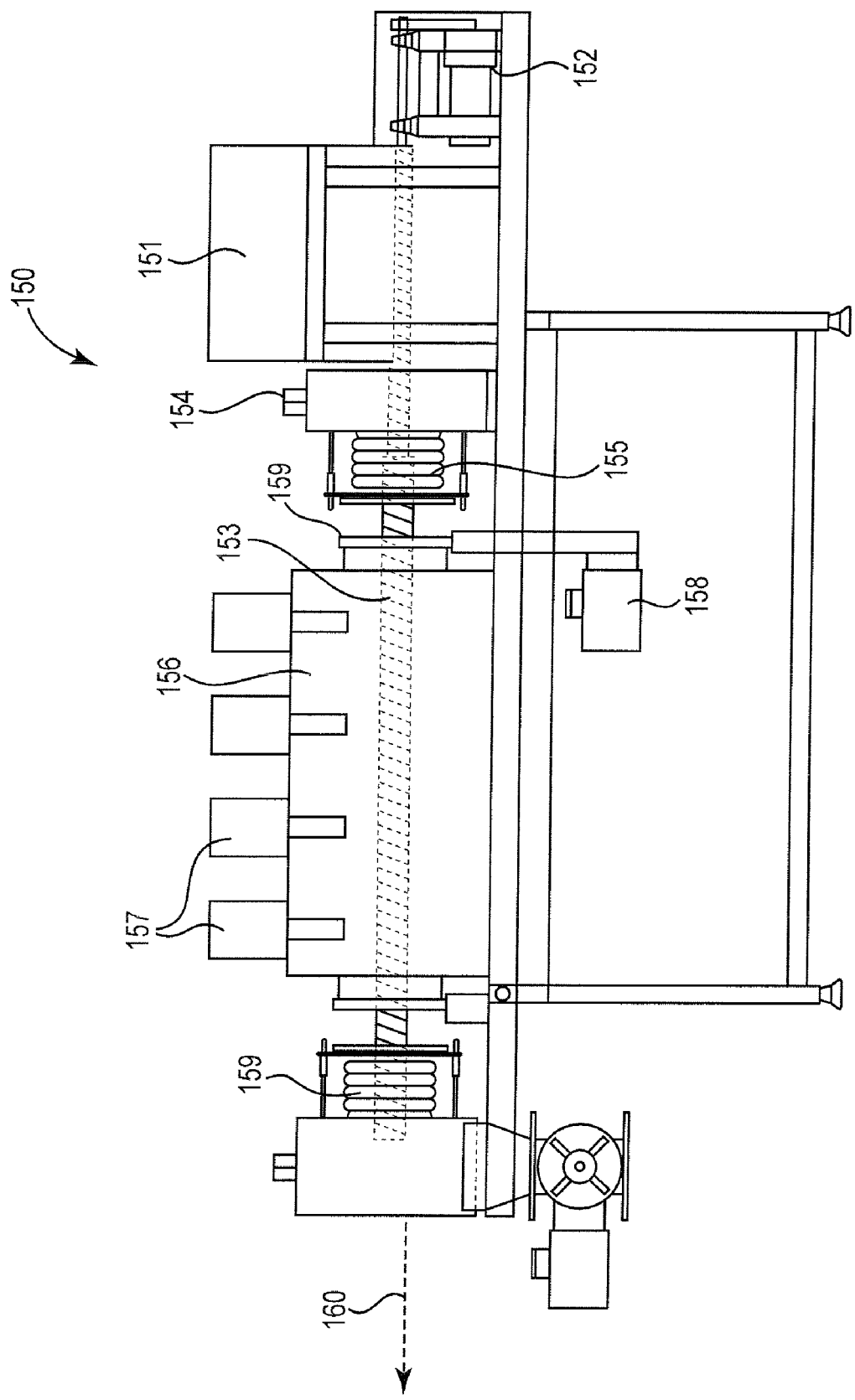
FIG. 1D is a diagram of a side view of a reaction chamber system in accordance with embodiments of the invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

The following description relates to approaches for processing gas, solid and/or liquid carbon-containing feedstock into fuels, e.g., diesel fuels, gasoline, kerosene, etc., by thermally and/or microwave enhanced reaction processes, including depolymerization, polymerization, reactive chemistry, isomerization, etc. For example, depolymerization may be caused by heating or by exposure to microwaves. Depolymerization, also referred to as "cracking", is a refining process that uses heat to break down (or "crack") hydrocarbon molecules into shorter polymer chains which are useful as fuels. Depolymerization and other reaction processes may be enhanced by adding a catalyst to the feedstock which increases the speed of the reaction and/or reduces the temperature and/or the radiation exposure required for the processes. Furthermore, the catalyst, such as zeolite, has a nanostructure which allows only molecules of a certain size to enter the crystalline grid or activate the surface areas of the catalyst and to interact with the catalyst. Thus, the catalyst advantageously is very effective at controlling the product produced by the reaction processes because only substances having a specified chain length may be produced using the catalytic process. Catalytic depolymerization is particularly useful for transforming biomass and other carbon-containing feedstock into fuels useable as transportation or heating fuels.

Any thermal and/or radiation driven fuel production techniques can be achieved using the methodologies and/or systems of the disclosed embodiments. Some of the examples provided herein are based on depolymerization processes, however, these are non-limiting in that they are provided as illustrations of the invention. Embodiments of the invention are also applicable to other processes of reactive chemistry, e.g., polymerization, isomerization.

One aspect of efficient depolymerization (and other reactions) is the ability to heat and/or irradiate the feedstock substantially uniformly to the temperature that is sufficient to cause depolymerization as well as activate the catalyst. Upon depolymerization, long hydrocarbon chains "crack" into shorter chains. Microwave heating has been shown to be particularly useful in heating systems for thermal depolymerization. Heating systems such as flame, steam, and/or electrical resistive heating, heat the feedstock by thermal conduction through the reaction chamber wall. These heating systems operate to heat the feedstock from the outside of the reaction chamber walls to the inside of the feedstock, whereas microwaves heat from the inside of the feedstock toward the reaction chamber walls. Using non-microwave heating sources, the heat is transferred from the heat source outside wall to the inside of the vessel wall that is in direct contact with the feedstock mixture. The heat is then transferred to the surfaces of the feedstock and then transferred, again, through the feedstock until the internal areas of the feedstock are at a temperature near the temperature of the reaction chamber wall.

One problem with this type of external heating is that there are time lags between vessel wall temperature transmission and raising the feedstock temperature that is contained in the center of the vessel as well as the internal area of the feedstock matrix. Mixing the feedstock helps to mitigate these conditions. Still, millions of microenvironments exist within the reactor vessel environment and the feedstock particles themselves. This causes uneven heat distribution within the reaction chamber of varying degrees. These variant temperature gradients cause uncontrollable side reactions to occur as well as degradation of early conversion products that become over-reacted because of the delay in conversion reaction timeliness. It is desirable to produce and retain consistent heating throughout the feedstock and the reaction products so that good conversion economics are achieved and controllable. Microwave heating is an efficient heating method and it also serves to activate catalytic sites.

Embodiments of the invention are directed to a reaction chamber system that can be used to process any carbon-containing feedstock, whether gas, solid and/or liquid, to extract the volatile organic compounds in the feedstock at a temperature range that will produce transportation fuels. The reaction chamber can also act in a reactive mode that will convert gaseous carbon feedstock into different gaseous chemical species. The system involves a heating system that enhances uniform heating and/or microwave irradiation throughout the feedstock, thereby increasing the efficiency of the reaction.

Some reaction chamber systems described herein use microwave heating to achieve more uniform temperature within the feedstock, and, as a result, a more efficient reaction. Microwaves are absorbed by the water molecules in the material that is irradiated in the microwave. When the water molecules absorb the microwaves, the molecules vibrate, which creates heat by friction, and the heat is convected to the surrounding material.

The reason microwaves are absorbed by water molecules is specific to the covalent bonds that attach the hydrogen to the oxygen in a water molecule. The oxygen atom in water has a large electronegativity associated with it due to the size of its nucleus in comparison to the hydrogen atom and the electrons from the two hydrogen atoms are drawn closer to the oxygen atom. This gives this end of the molecule a slight negative charge and the two hydrogen atoms then have a slight positive charge. The consequence of this distortion is that the water molecule acts like a small, weak magnet. The dipole feature of the water molecule allows the molecule to absorb the microwave radiation and starts it vibrating like a guitar string. The vibration of the bonds causes friction that turns to heat and then spreads out into the irradiated material.

To take advantage of this feature of microwave radiation, a reaction chamber system described herein takes advantage of microwave irradiation and/or heating in processing feedstock that contains carbon and can be converted to transportation fuels. The reactor may be made from a substantially microwave transparent substance such as quartz, a glass-like material that is substantially transparent to microwave radiation. Because quartz can be manipulated into many shapes, it provides design discretion for shaping the reaction chamber, but in one example the reaction chamber is configured in the shape of a tube or cylinder. The cylindrical shape allows for the feedstock to feed in one end and exit at the opposite end. An example of a suitable reaction chamber would be a quartz tube that is about four feet long with a wall thickness of 3/16".

Microwave radiation is generated by a magnetron or other suitable device. One or more microwave producing devices, e.g., magnetrons can be mounted external to the quartz tube wall. Magnetrons come in different power ranges and can be controlled by computers to irradiate the processing feedstock with the proper energy to convert the feedstock to most desirable fuel products efficiently. In one application, the magnetron can be mounted on a cage that would rotate around the outside of the reactor tube as well as travel the length of the reactor tube. Feedstock traveling through the length of the inside of the tube will be traveling in a plug flow configuration and can be irradiated by fixed and/or rotating magnetrons. A computer may be used to control the power and/or other parameters of the microwave radiation so that different feedstock, with different sizes and densities can be irradiated at different parameter settings specific to the feedstock and thus convert the feedstock more efficiently.

These configurations of a reactor will allow efficient processing of feedstocks, from relatively pure feedstock streams to mixed feedstock streams that include feedstocks of different densities, moisture contents, and chemical make up. Efficiencies can occur because the fuel products are extracted from the reactor chamber as they are vaporized from the feedstock, but further processing of the remaining feedstock occurs until different fuel products are vaporized and extracted. For example, dense feedstock, such as plastics, take longer to process into a useable fuel than less dense feedstock, such as foam or wood chips. The system described herein continues to process dense feedstock without over-processing the earlier converted products from the less dense feedstock. This is accomplished by using both stationary and rotating microwave generators.

One example of a mixed feedstock would be unsorted municipal solid waste. In some implementations, catalyst may be added in the feedstock which helps in the conversion of the feedstock as well as the speed at which the conversion can progress. A catalyst can be designed to react at the preset processing temperature inside the reactor or to react with the impinging microwave radiation. In some embodiments, no catalyst is required. In other embodiments, the catalyst may be a rationally designed catalyst for a specific feedstock.

The plug flow configuration with the reactors described herein will allow adjustments to the residence time that the feedstock resides within the reactor core for more efficient exposure to the heat and the radiation of the microwaves to produce the desired end products.

Inlets and/or outlets, e.g., quartz inlets and/or outlets can be placed along the walls of the reaction chamber to allow for pressure and/or vacuum control. The inlets and outlets may allow the introduction of inert gases, reactive gases and/or the extraction of product gases.

Thus, the design of the microwave-transparent reaction chamber, the use of microwaves as a heating and/or radiation source with fixed and/or rotating magnetrons, plug flow processing control, with or without the use of catalysts, will allow the processing of any carbon-containing feedstock in any physical phase.

A system in accordance with embodiments of the invention includes a reaction chamber having one or more substantially microwave-transparent walls and a microwave heating/radiation system. The microwave heating/radiation system is arranged so that microwaves generated by the heating/radiation system are directed through the substantially microwave-transparent walls of the reaction chamber and into the reaction cavity where the feedstock material is reacted without substantially heating the walls of the reaction chamber. To enhance the temperature uniformity of the feedstock, the reaction chamber and the heating/radiation system may be in relative motion, e.g., relative rotational and/or translational motion. In some implementations, the heating system may rotate around a stationary reaction chamber. In some implementations, the feedstock within the reaction chamber may rotate by the use of flights with the heating/radiation system remaining stationary. In some implementations, the reaction chamber may rotate with the heating system remaining stationary. In yet other implementations, both the reaction chamber and the heating/radiation system may rotate, e.g., in countercurrent, opposing directions. To further increase temperature uniformity, the system may include a mechanism for stirring and/or mixing the feedstock material within the reaction chamber. The reaction chamber may be tilted during reaction process, for example, to force the feedstock to go through the catalytic bed.

FIGS. 1A and 1B illustrate side and cross sectional views, respectively, of a system 100 for converting carbon-containing feedstock to fuel in accordance with embodiments of the invention. Although the reaction chamber 110 may be any suitable shape, the reaction chamber 110 is illustrated in FIGS. 1A and 1B as a cylinder having a cylindrical wall 111 that is substantially transparent to microwaves in the frequency range and energy used for the reaction process. The reaction chamber 110 includes a reaction cavity 112 enclosed by the cylindrical wall 111. The system 100 includes a transport mechanism 118 configured to move the feedstock through the reaction chamber. The operation of the system 100 with regard to the reactions taking place within the reaction chamber 110 may be modeled similarly to that of a plug flow reactor.

As illustrated in FIG. 1A, system includes a transport mechanism 118 for moving the feedstock material through the reaction chamber 110. The transport mechanism 118 is illustrated as a screw auger, although other suitable mechanisms, e.g., conveyer, may also be used. The transport mechanism 118 may further provide for mixing the feedstock within the reaction chamber. In some embodiments, the reaction chamber wall 111 may have a thickness of about 3/16 inches. The smoothness of the reaction chamber wall 111 facilitates the movement of the feedstock through the reaction chamber 110.

A heating/radiation subsystem 115 may include any type of heating and/or radiation sources, but preferably includes a microwave generator 116 such as a magnetron which is configured to emit microwaves 113 having a frequency and energy sufficient to heat the carbon-containing feedstock to a temperature sufficient to facilitate the desired reaction of the feedstock, for example, for depolymerization of the feedstock, microwaves in a frequency range of about 0.3 GHz to about 300 GHz may be used. For example, the operating power of the magnetrons may be in the range of about 1 Watt to 500 kilowatts. The magnetron 116 is positioned in relation to the reaction chamber 110 so that the microwaves 113 are directed through the wall 111 of the reaction chamber 110 and into the reaction cavity 112 to heat and/or irradiate the material therein. A mechanism 117 provides relative motion between the magnetron 116 and the reaction chamber 110 along and/or around the longitudinal axis 120 of the reaction chamber 110. In some embodiments, the mechanism 117 may facilitate tilting the reaction chamber 110 and/or the magnetron 116 at an angle $\theta$ (FIG. 1C) to facilitate the reaction of the feedstock and/or the extraction of gases, for example. In the embodiment illustrated in FIGS. 1A-C, the magnetron 116 is positioned on a rotational mechanism 117, such as a rotatable cage or drum, that rotates the magnetron 116 around the stationary reaction chamber 110. In some implementations, the rotation around the chamber may not be complete, but the rotation path may define an arc around the circumference of the reaction chamber. The rotation may occur back and forth along the path of the arc. As previously mentioned, in some embodiments, the reaction chamber 110 may be the rotating component, or both the heating/radiation subsystem 116 and the reaction chamber 110 may rotate, e.g., in opposing, countercurrent directions. The rotation between the reaction chamber and the magnetron provides more even heating and more even microwave exposure of the feedstock within the reaction cavity 112, thus enhancing the efficient reaction chemistry of the feedstock and/or other processes that are temperature/radiation dependent, such as removal of water from the feedstock. The rotation lessens the temperature gradient and/or maintains a more constant microwave flux across the plug inside the reaction chamber.

The reaction chamber 110 may include one or more entry ports 120, e.g., quartz entry ports, configured to allow the injection or extraction of substances into the reaction cavity 112. In one implementation, the quartz ports may be used to extract air and/or oxygen from the reaction cavity. Extraction of air and/or oxygen may be used to suppress combustion which is desirable for some processes.

For example, in certain embodiments, the system 100 may be used to preprocess the feedstock through compression and/or removal of air and/or water. In this application, gases such as hydrogen and/or nitrogen may be injected through one or more ports 120 to hydrogenate and/or suppress combustion of the feedstock. The reaction chamber 110 may also include one or more exit ports 121, e.g., quartz exit ports, configured to allow passage of water, water vapor, air, oxygen and/or other substances and/or by-products from the reaction chamber 110.

FIG. 1D is a diagram illustrating a reaction chamber system 150 for producing fuel from carbon-containing feedstock in accordance with embodiments of the invention. The system 150 includes an input hopper (also referred to as a load hopper) 151 configured to allow introduction of the feedstock material into the system 150. A gearmotor auger drive 152 provides a drive system for the auger 153 that transports the feedstock through the system 150. As the feedstock is compressed in the load hopper 151, air is extracted through the atmosphere outlet 154. A seal 155 isolates the load hopper 151 from the reaction chamber 156 to maintain a level of vacuum. The reaction chamber 156 includes walls of a microwave-transparent material. One or more stationary microwave heads 157 are positioned at the walls of the reaction chamber 156. In addition, the system 150 includes one or more rotating microwave heads 158. In one implementation, each rotating microwave head is located at a fixed position with respect the longitudinal axis 160 of the reaction chamber 156. The rotating microwave head is mounted on a slipring bearing 159 which allows the microwave head 158 to rotate around the reaction chamber 156. In some implementations the rotating microwave head(s) 158 may rotate around the longitudinal axis 160 of the reaction chamber 156 as well as moving back and forth along the longitudinal axis 160. The system 150 includes a seal at the exit of the reaction chamber 156 to maintain the reaction chamber vacuum.

Figure 2A:
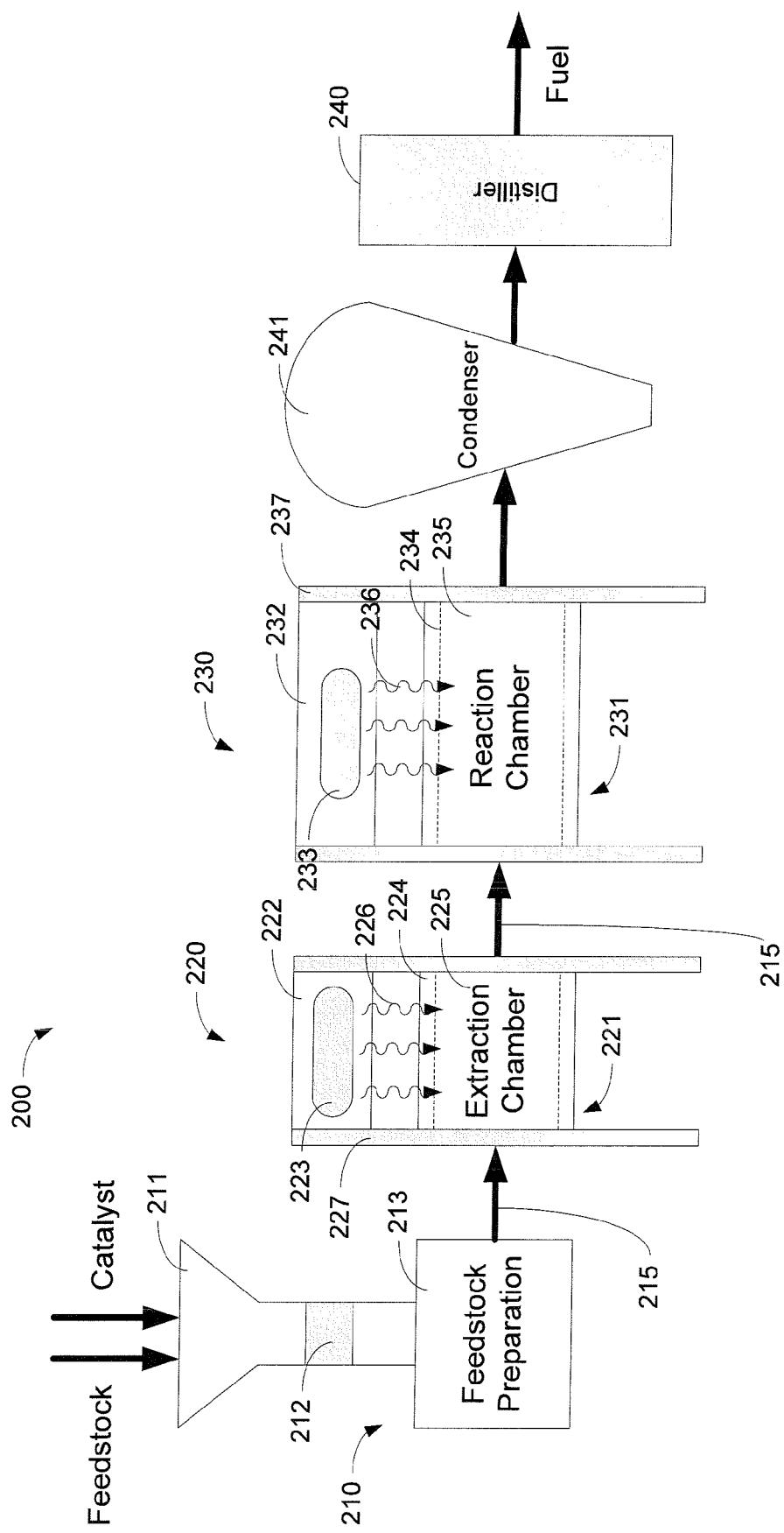
FIG. 2A is a block diagram of a system that uses the reaction chamber systems illustrated in FIGS. 1A and 1B for water/air extraction and a reaction process in accordance with embodiments of the invention.
Figure 2B:
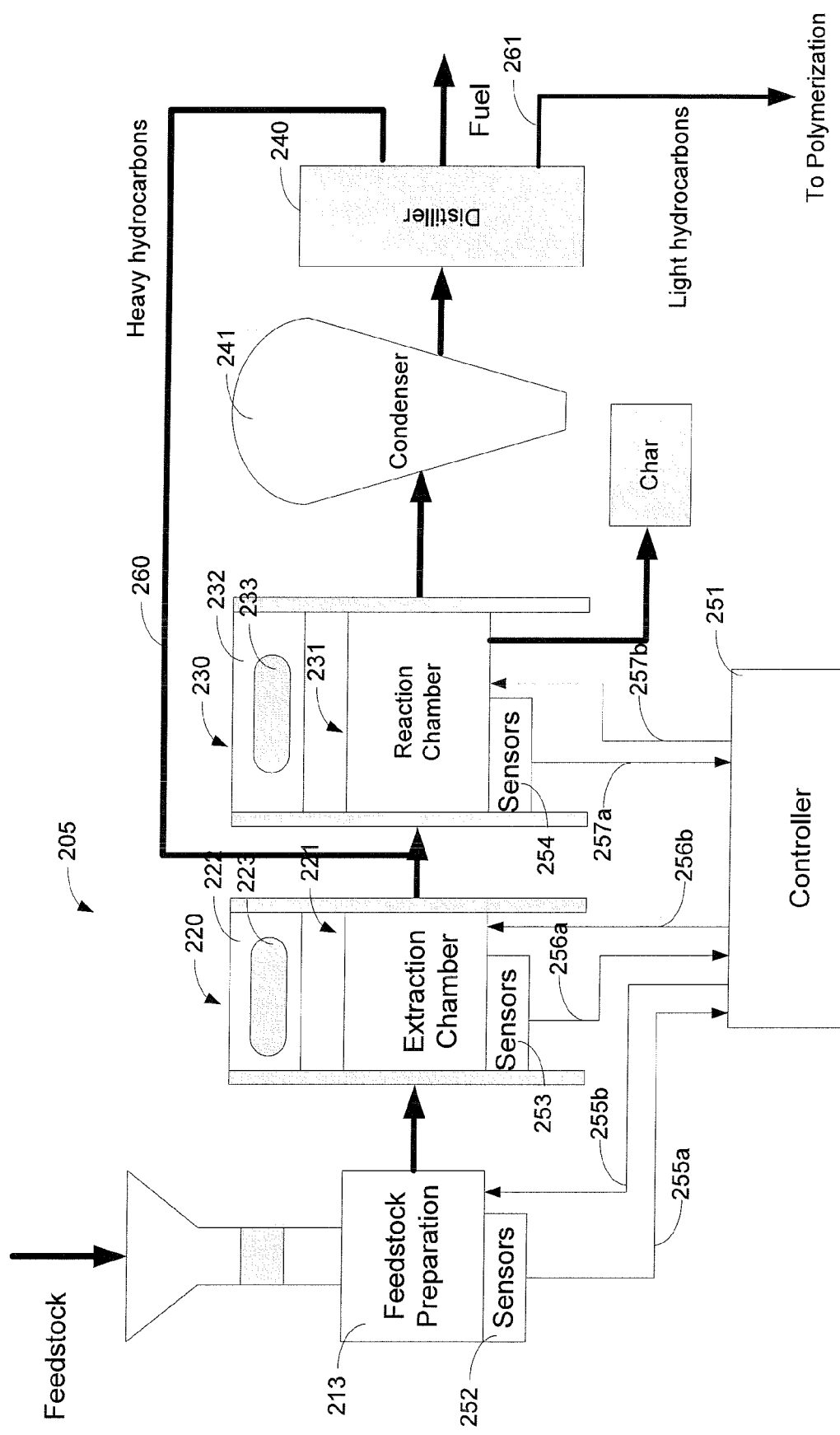
FIG. 2B illustrates a reaction system that includes feedback control in accordance with embodiments of the invention.

FIG. 2A is a block diagram of a system 200 that uses one or more of the reaction chamber systems 100 illustrated in FIGS. 1A and 1B. The reaction chamber systems 220, 230 may be arranged and/or operated in series or in a parallel configuration. The extraction process 220 and the reaction process 230 depicted in FIGS. 2A and 2B are illustrated as occurring in two separate reaction chambers, e.g., that operate at different temperatures. Alternatively, the extraction process and the reaction process may be implemented in a single reaction chamber with two separate zones, e.g., two separate temperature zones.

In the system 200 of FIG. 2, one or both of the water/air extraction subsystem 220 and the reaction subsystem 230 may be similar to the reaction chamber system 100 of FIGS. 1A and 1B. Carbon-containing feedstock, such as manure, wood chips, plant-based cellulose, tires, municipal solid waste, enters the system through a hopper 211, and traverses an airlock 212 to enter a feedstock preparation module 213. If needed, a catalyst, such as zeolite, and/or other additives that enhance the reaction process, for example to adjust the pH, may be introduced into the system 200 through the input hopper 211 and/or the entry ports (shown in FIG. 1B). In the feedstock preparation module 213, the feedstock material is shredded to a predetermined particle size may be dependent on the properties of the feedstock, such as the purity, density, and/or chemical composition of the feedstock. If used, the catalyst may be added at the time that the feedstock is being prepared so that the catalyst is evenly dispersed within the feedstock material before entering the reaction chamber 231. In general, the less uniform the feedstock, the smaller the particle size needed to provide efficient reaction.

After the initial feedstock preparation stage, the shredded and mixed feedstock is transported by a transport mechanism 215 into the reaction chamber 221 of the next stage of the process. The air/water extraction subsystem 220, which performs the optional processes of water and/or extraction prior to the reaction process, has similarity to the system illustrated in FIGS. 1A and 1B, includes a heating/radiation module 222 comprising at least a magnetron 223 configured to generate microwaves 226 which may be mounted on a rotational or stationary mechanism 227. If mounted on a rotational mechanism, the mechanism rotates the magnetron 223 either partially or fully around the reaction chamber 221 as the microwaves 226 are directed through the wall 224 of the reaction chamber 221 and into the reaction cavity 225 impinging on and heating the feedstock therein. In some embodiments, the heating module 222 may utilize only one magnetron 223 or only two or more magnetrons without using other heat/radiation sources.

In some embodiments, the heating/radiation module 222 may utilize the magnetron 223 in addition to other heat sources, such as heat sources that rely on thermal conduction through the wall of the reaction chamber, e.g., flame, steam, electrical resistive heating, recycled heat from the process, and/or other heat sources. During the air and/or water extraction process, the feedstock may be heated to at least 100 C, the boiling point of water, to remove excess water from the feedstock. The excess water (e.g., in the form of steam) and/or other substances may exit the reaction chamber 221 via one or more exit ports. Additives to the feedstock, such as inert and/or reactive gases including hydrogen and/or nitrogen, may be introduced via one or more input ports into the reaction chamber 221 of the water/air extraction process. In addition to being heated and/or irradiated by microwaves, the feedstock may also be subjected to a pressurized atmosphere and/or a vacuum atmosphere and/or may be mechanically compressed to remove air from the reaction chamber 221.

After the optional air and/or water extraction process, the transport mechanism 215 moves the feedstock to the next processing stage 230 which involves the reaction process, e.g., thermal depolymerization, of the feedstock. After the feedstock/catalyst mixture enters the reaction chamber 231, it is heated to a temperature that is sufficient to facilitate the desired reaction. For example, to produce diesel fuel through depolymerization, a temperature of in a range of about 20° C. to about 35° C. is used to crack the hydrocarbons in the feedstock into shorter chains. In addition to being heated, the feedstock may also be subjected to a pressurized atmosphere, a vacuum atmosphere and/or may be mechanically compressed in the reaction chamber 231.

In some embodiments, heating/radiation in the reaction chamber 231 is accomplished using a magnetron 233 emitting microwaves 236. The magnetron 233 may rotate relative to the reaction chamber 231. As previously described in connection with the water extraction stage 220, the rotating magnetron 233 may be supported by rotational mechanism 237, such as a cage or drum. The rotational mechanism 237 allows relative rotational motion between the magnetron 233 and the reaction chamber 231. For example, the magnetron 233 may rotate completely around the reaction chamber 231 or the rotation of the magnetron 233 may proceed back and forth along an arc that follows the circumference of the reaction chamber 231. The rotating magnetron heating system 233 may be supplemented using a stationary magnetron, and/or other conventional heat sources such as a flame or electrical resistive heating. Rotating the magnetron 233 provides more even heating/radiation of the feedstock material and catalyst within the reaction cavity 235 and enhances the heating properties over that of stationary heat sources.

The cracked hydrocarbons vaporize and are collected in a condenser 241 and liquefy and then are sent to the distiller 240 to the diesel fuel, while heavier, longer chain hydrocarbon molecules may be recycled back to the reaction chamber. In some implementations, distillation may not be necessary, and the fuel product only needs to be filtered.

In some configurations, it is desirable to control the processes of the reaction to allow a higher efficiency of fuel extraction from the feedstock. FIG. 2B is a block diagram of a system 205 that includes the system components described in connection with FIG. 2A along with a feedback control system 250. The illustrated feedback control system 250 includes a controller 251 and one or more sensors 252, 253, 254 which may be configured to sense parameters at various stages during the process. The feedback control system 250 may include sensors 252 at the feedstock preparation stage which are configured to sense parameters of the feedstock and/or feedstock preparation process. For example, the sensors 252, may sense the chemical composition of the feedstock, density, moisture content, particle size, energy content or other feedstock parameters. The sensors 252 may additionally or alternatively sense the conditions within the feedstock preparation chamber, e.g., flow, pressure, temperature, humidity, composition of the gases present in the chamber, etc. The sensors 252 develop signals 255a which are input to the controller electronics 251 where they are analyzed to determine the condition of the feedstock and/or the feedstock preparation process. In response to the sensed signals 255a, the controller 251 develops feedback signals 255b which control the operation of the feedstock preparation module 213. For example, in some implementations, the controller 251 may control the feedstock preparation module 213 to continue to shred and/or grind the feedstock material until a predetermined particle size and/or a predetermined particle size variation is detected. In another example, based on the sensed chemical composition of the feedstock, the controller 251 may cause a greater or lesser amount of catalyst to be mixed with the feedstock or may cause different types of catalyst to be mixed with the feedstock.

The control system 250 may also develop feedback signals 256b, 257b to control the operation of the water extraction module 220 and/or the reaction module 230, respectively, based on sensed signals 256a, 257a. For example, the sensors 253, 254 may sense the temperature of the water extraction and/or reaction processes and the controller 251 may develop feedback signals 256b, 257b to control the operation of the heating/radiation systems 222, 232, e.g., power, frequency, pulse width, rotational or translational velocity, etc. of one or both of the magnetrons 223, 233. The controller 251 may develop feedback signals to the magnetrons to control the amount of radiation impinging on the feedstock so that the feedstock will not be over- or under-cooked and development of hot spots will be avoided. The controller 250 may control the injection of various substances into one or both of the extraction chamber and/or the reaction chamber 221, 231 through the entry ports to control the processes taking place within the chambers 221, 231. The residue of the depleted feedstock (char) is sent to a storage unit. After the distillation stage, the heavy hydrocarbons may be recycled back into the reaction chamber and the lighter hydrocarbons may be sent on to a polymerization stage.

Figure 3A:
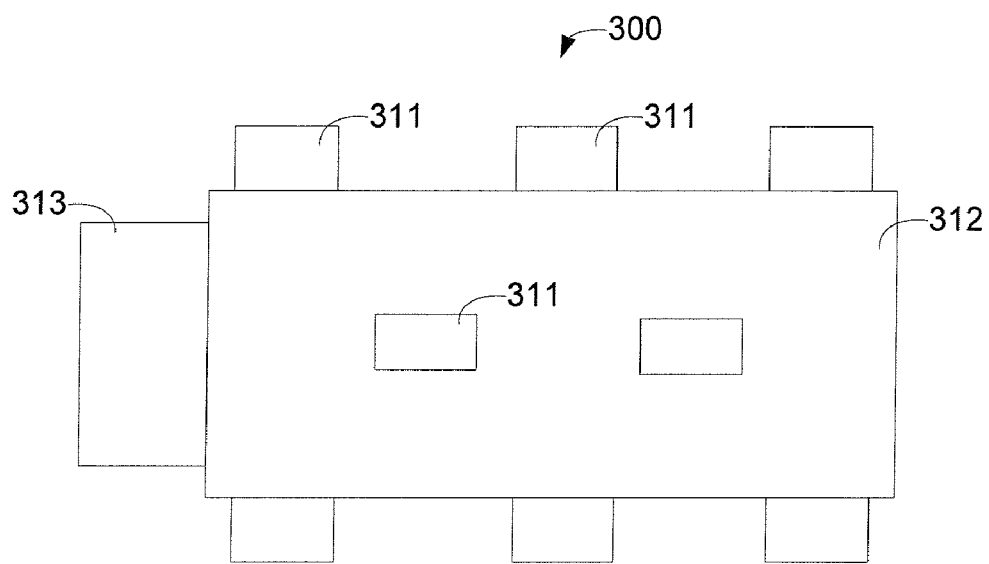
FIG. 3A shows system which includes multiple stationary magnetrons arranged on a drum that is disposed outside a cylindrical reaction chamber having one or more microwave-transparent walls.
Figure 3B:
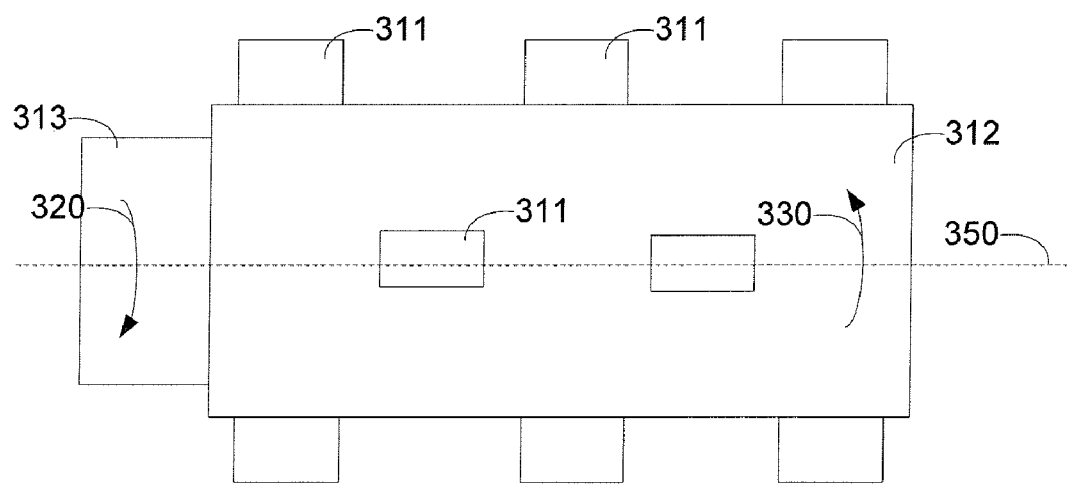
FIG. 3B illustrates a system having a drum supporting magnetrons which may be rotated around the longitudinal axis of the reaction chamber while the reaction chamber is concurrently rotated around its longitudinal axis.

As previously discussed, the reaction chambers may be made of quartz, glass, ceramic, plastic, and/or any other suitable material that is substantially transparent to microwaves in the frequency and energy range of the reaction processes. In some configurations, the heating/radiation systems described herein may include one or more magnetrons that rotate relative to the reaction chamber. In some embodiments, the magnetrons may be multiple and/or may be stationary. FIG. 3A illustrates system 300 which includes multiple stationary magnetrons 311 arranged on a drum 312 that is disposed outside a cylindrical reaction chamber 313 having one or more microwave-transparent walls. The operation of the magnetrons may be continuous, or may be pulsed, e.g., in a multiplexed pattern. In some embodiments (FIG. 3B), the drum 312 supporting the magnetrons 311 may be rotated 320 around the longitudinal axis 350 of the reaction chamber 313 and/or the reaction chamber 313 may be rotated 330 around its longitudinal axis 350.

Figure 3C:
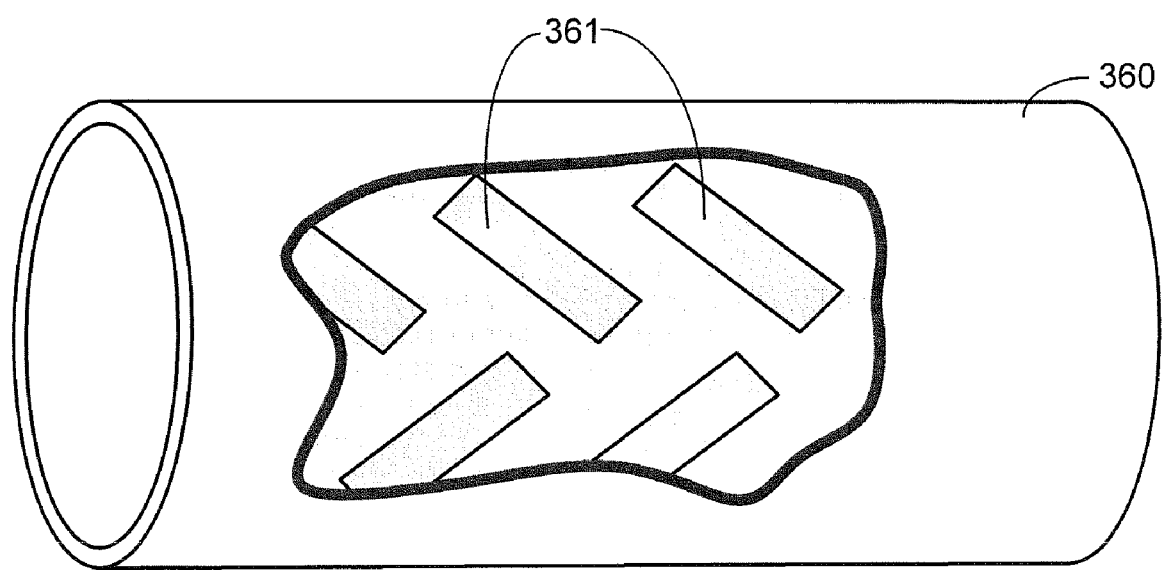
FIG. 3C shows a reaction chamber with a feedstock transport mechanism comprising baffles.

A feedstock transport mechanism may be disposed within the reaction chamber. For example, as illustrated in FIG. 3C, the feedstock transport mechanism may comprise one or more baffles 361 that are configured to move the feedstock through the reaction chamber 360 as the reaction chamber rotates. The baffles 361 may be mounted to the walls of the reaction chamber 360 and/or may be otherwise installed within the reaction chamber to provide movement of feedstock within and through the reaction chamber 360, e.g., longitudinally through the reaction chamber.

In some embodiments, illustrated in FIG. 4, one or more secondary heat sources 450, such as a flame, steam, and/or electric resistive heating, or recycled heat, may be used in addition to magnetrons 416 which are stationary, or are supported on a mechanism 417 that rotates around the circumference of the reaction chamber 420. In some configurations, the magnetrons 416 may not make a complete revolution around the reaction chamber 420, but may rotate back and forth 419 along an arc that follows the circumference of the reaction chamber 420.

Figure 5:
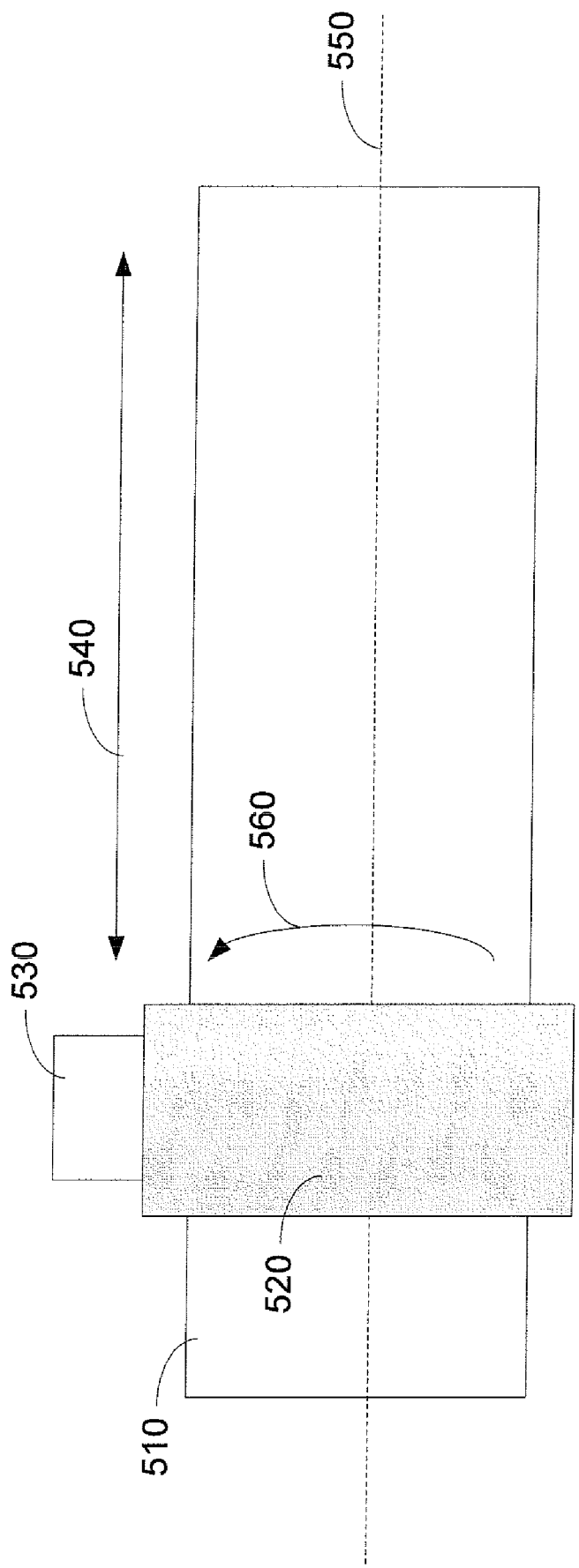
FIG. 5 depicts a system wherein a magnetron is moved along the longitudinal axis of the reaction chamber and is rotated around the longitudinal axis of the reaction chamber.

Movement of the one or more magnetrons relative to the reaction chamber may also include motion that moves the magnetron along the longitudinal axis of the reaction chamber, as illustrated in FIG. 5. FIG. 5 illustrates a reaction chamber 510 and a cage 520 that supports a magnetron 530. The cage 520 and magnetron 530 may be moved 540 back and forth along the longitudinal axis 550 of the reaction chamber 510. In some implementations, in addition to and/or concurrent with the motion 540 of the cage 520 and magnetron 530 along the longitudinal axis 550, the cage 520 and magnetron 530 may be rotated 560 around the longitudinal axis 550.

Figure 6:
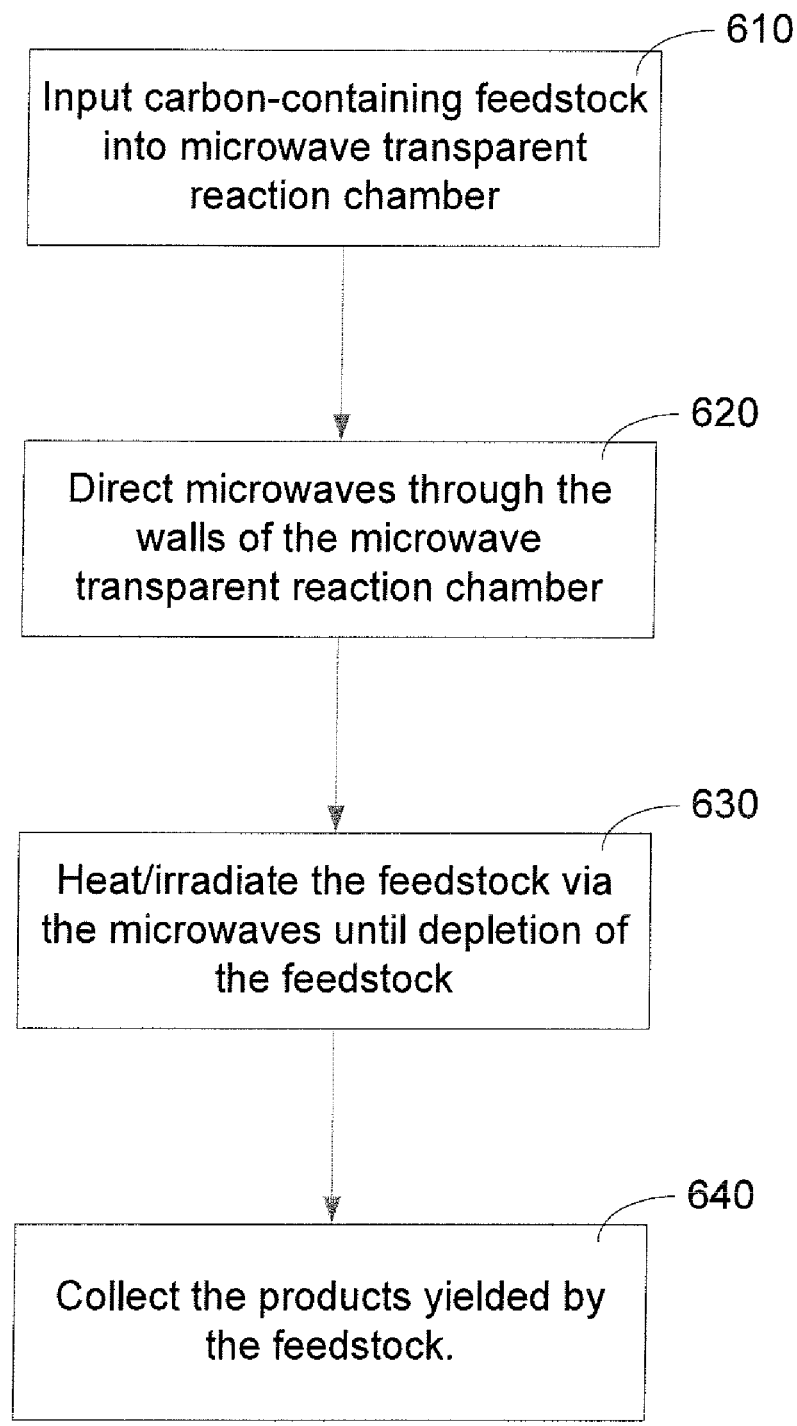
FIG. 6 is a flow diagram of a process for generating fuel from carbon-containing feedstock in accordance with embodiments of the invention.

FIG. 6 is a flow chart illustrating a process for producing fuel from a carbon-containing feedstock in accordance with embodiments of the invention. A carbon-containing feedstock, such as biomass, municipal solid waste, plant material, wood chips and the like is input 610 to a reaction chamber having walls that are substantially transparent to microwaves used to heat and/or irradiate the feedstock. The feedstock may be a gas, liquid and/or solid matter. The heating and/or radiation occurs by directing 620 the microwave energy through the walls of the reaction chamber so that it impinges on the feedstock disposed within the reaction chamber. The feedstock is heated/irradiated 630 by the microwaves, optionally in the presence of a catalyst, until reaction of the carbon-containing molecules occurs to produce the desirable end fuel product. The fuel product created by the reaction processes are collected 640.

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A system for producing fuel from a carbon-containing feedstock, comprising:
a first reaction chamber comprising a first microwave-transparent chamber wall and a first reaction cavity configured to hold the carbon-containing feedstock and having a steam exit port;
a second reaction chamber, separate from the first reaction chamber, the second reaction chamber comprising a second microwave-transparent chamber wall and a second reaction cavity configured to hold the carbon-containing feedstock;

a microwave subsystem comprising at least one microwave device configured to emit microwaves when energized, the microwave device positioned relative to the first and second reaction chambers so that the microwaves are directed through the first and second microwave-transparent chamber walls and into the first and second reaction cavities, respectively;

a mechanism configured to provide relative motion between the microwave device and at least one of the first and second reaction chambers; and a motor-driven feedstock transport mechanism configured to mechanically compress the carbon-containing feedstock in the first reaction chamber and to move the carbon-containing feedstock into the second reaction chamber;

wherein the microwave subsystem is configured to cause the microwave device to heat the carbon-containing feedstock in the first reaction chamber to a first temperature of about 100° C. while steam exits from the first reaction chamber via the steam exit port and to heat the carbon-containing feedstock in the second reaction chamber to a second temperature, different from the first temperature, and wherein the system is configured so that reactions in the first and second reaction chambers convert the carbon-containing feedstock to a transportation fuel product at an output of the system.

2. The system of claim 1, wherein the relative motion is relative rotational motion around a longitudinal axis of the reaction chambers.

3. The system of claim 1, wherein the first and second reaction chambers are configured to contain the feedstock which comprises one or more of liquid and gas.

4. The system of claim 1, wherein:
the feedstock comprises one or more of biomass, manure, plant-based cellulose, landfill material, and municipal solid waste; and
further comprising a feedstock preparation module configured to shred the feedstock to a predetermined particle size that is dependent on composition, density, and uniformity of the feedstock.

5. The system of claim 1, wherein:
the reaction chamber is a cylinder; and
the microwave-transparent chamber wall comprises a cylindrical wall around the reaction cavity and wherein the motor-driven feedstock transport mechanism comprises a gearmotor auger.

6. The system of claim 1, further comprising a condenser configured to collect vaporized cracked hydrocarbons and to recycle heavier hydrocarbons to the second reaction chamber.

7. The system of claim 1, wherein the reaction chamber is stationary and the mechanism is configured to rotate the microwave device around the circumference of the reaction chamber.

8. The system of claim 1, wherein the microwave device is stationary and the mechanism is configured to rotate the reaction chamber.

9. The system of claim 1, wherein the mechanism is configured to rotate both the reaction chamber and the microwave device.

10. The system of claim 1, further comprising:
sensors configured to sense chemical composition of the carbon-containing feedstock; and
a mixing mechanism configured to mix the carbon-containing feedstock with catalyst, a type and amount of the catalyst selected according to the sensed composition and amount of the carbon-containing feedstock.

11. The system of claim 1, wherein the microwave device is configured to operate in one or both of a continuous mode and a pulsed mode in a frequency range of about 0.3 GHz to about 300 GHz at a power between about 1 W to about 500 kW.

12. The system of claim 1, wherein the microwave subsystem comprises a plurality of microwave devices, including one or more microwave devices that rotate around the reaction chamber and one or more microwave devices that are stationary.

13. The system of claim 1, further comprising seals located at an input and exit of at least one of the first and second reaction chambers.

14. The system of claim 12, wherein a first set of the microwave devices operate in a pulsed mode during a period of time in which a second set of the microwave devices operate in a continuous mode.

15. The system of claim 1, wherein the microwave subsystem further comprises one or more heat sources which are not microwave-based.

16. The system of claim 1, further comprising:
a computer controller configured to control operation of one or more of the microwave subsystem, the mechanism and the feedstock transport mechanism.

17. The system of claim 16, further comprising one or more sensors, the sensors configured to sense one or more properties of the feedstock and to provide one or more feedback signals to the controller, wherein the controller is configured to control operation of one or more of the microwave subsystem, the mechanism configured to provide relative motion, and the feedstock transport mechanism based on the feedback signals.

18. The system of claim 1, wherein the feedstock transport mechanism comprises one or more baffles attached to inner walls of at least one of the first and second reaction chambers.

19. The system of claim 1, wherein:
the first temperature is sufficient for extracting moisture from the feedstock and below a depolymerization temperature, and the second temperature is sufficient to depolymerize the feedstock.

20. The system of claim 1, wherein:
the microwave subsystem is configured to heat the feedstock in the second reaction chamber to the second temperature that is greater than the first temperature.

21. The system of claim 1, further comprising:
a feedstock conditioning module configured to condition the feedstock before the feedstock is introduced into the reaction cavity;
one or more ports configured to allow entry or exit of one or more substances into one or both of the feedstock conditioning module and the reaction cavity;
one or more sensors configured to respectively sense one or more properties of the feedstock and to develop signals based on the sensed properties; and
a controller configured to control the operation of one or more of the feedstock conditioning module, the ports, the feedstock transport mechanism, the microwave subsystem, and the feedstock transport mechanism based on the signals.

22. A process for converting a carbon-containing compound to fuel, comprising:
inputting carbon-containing feedstock into a first substantially microwave-transparent reaction chamber;
mechanically compressing the carbon-containing feedstock;

directing microwaves from a microwave source through walls of the first reaction chamber to impinge on the feedstock;

moving the feedstock from the first substantially microwave-transparent reaction chamber into a second substantially micro-wave transparent reaction chamber;

directing microwaves from a microwave source through walls of the second reaction chamber to impinge on the feedstock;

providing relative motion between the first and second microwave-transparent reaction chambers and the microwave source;

microwaving the feedstock in the first reaction chamber until the feedstock reaches a temperatures of about 100° C.; and microwaving the feedstock in the second reaction chamber to a second temperature different from the first temperature and until the feedstock reacts to produce a transportation fuel product.

23. The process of claim 22, further comprising mixing a catalyst with the feedstock.

24. The process of claim 22, wherein at least one source of the microwaves is rotated to produce a rotating microwave field relative to at least one of the first and second reaction chambers.

25. The process of claim 22, wherein providing the relative motion comprises:

rotating at least one source of the microwaves; and rotating at least one of the first and second reaction chambers in a direction opposing a direction of the rotation of the microwave source.

26. The process of claim 22, further comprising:

sensing one or more parameters of the feedstock, the first reaction chamber, the second reaction chamber and/or the environment within at least one of the first and second reaction chambers; and controlling one or more variables of the process based on the sensed parameters.

27. The process of claim 26, wherein the one or more parameters comprise temperature, moisture content, chemical composition, density, and particle size.

28. A system for converting a carbon-containing compound to fuel, comprising:

means for inputting carbon-containing feedstock into a first substantially microwave-transparent reaction chamber;

means for generating microwaves and directing the microwaves through walls of the first reaction chamber to impinge on the feedstock;

means for moving the feedstock from the first substantially microwave-transparent reaction chamber into a second substantially micro-wave transparent reaction chamber that is separate from the first reaction chamber;

means for generating microwaves and directing the microwaves through walls of the second reaction chamber to impinge on the feedstock;

means for providing relative motion between the microwave-transparent reaction chamber and the microwave source;

means for microwaving the feedstock in the first reaction chamber to a first temperature of about 100° C.; and means for microwaving the feedstock in the second reaction chamber to a second temperature different from the first temperature until the feedstock reacts to produce a transportation fuel product.

* * * * *

UNITED STATES PATENT AND TRADEMARK OFFICE
CERTIFICATE OF CORRECTION

PATENT NO. : 8,361,282 B2  
APPLICATION NO. : 12/854754  
DATED : January 29, 2013  
INVENTOR(S) : Douglas Van Thorre, Michael Catto and Sherman Aaron Page 1 of 1

It is certified that error appears in the above-identified patent and that said Letters Patent is hereby corrected as shown below:

In the Claims

Column 11, line 42, Claim 4: "and uniformity" should read --and purity--.

Column 12, line 39, Claim 19: "temperature is sufficient for extracting" should read --temperature acts to extract--.

Column 12, line 40, Claim 19: "and below" should read --and the first temperature is below--.

Column 12, line 41, Claim 19: "temperature is sufficient to" should read --temperature acts to--.

Signed and Sealed this  
Ninth Day of April, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,361,282 B2
APPLICATION NO. : 12/854754
DATED : January 29, 2013
INVENTOR(S) : Douglas Van Thorre et al.

Page 1 of 1

It is certified that error appears in the above-identified patent and that said Letters Patent is hereby corrected as shown below:

In the Specification:

Col. 8, lines 32 and 33: "about 20° C. to about 35° C is" should read
--about 200 C to about 350 C is--.

Signed and Sealed this
Twelfth Day of November, 2013

Teresa Stanek Rea
*Deputy Director of the United States Patent and Trademark Office*